(12) United States Patent
Brill et al.

(10) Patent No.: US 6,563,936 B2
(45) Date of Patent: May 13, 2003

(54) SPATIO-TEMPORAL CHANNEL FOR IMAGES EMPLOYING A WATERMARK AND ITS COMPLEMENT

(75) Inventors: Michael H. Brill, Morrisville, PA (US); Michael A. Isnardi, Plainsboro, NJ (US); Albert P. Pica, East Windsor, NJ (US)

(73) Assignee: Sarnoff Corporation, Princeton, NJ (US)

(*) Notice: Subject to any disclaimer, the term of this patent is extended or adjusted under 35 U.S.C. 154(b) by 91 days.

(21) Appl. No.: 09/803,392

(22) Filed: Mar. 9, 2001

(65) Prior Publication Data

US 2002/0027612 A1 Mar. 7, 2002

Related U.S. Application Data

(63) Continuation-in-part of application No. 09/656,892, filed on Sep. 7, 2000.

(51) Int. Cl.[7] .............................................. H04K 1/00
(52) U.S. Cl. ........................ 382/100; 348/463; 348/465
(58) Field of Search ................................ 382/100, 232; 713/176; 380/210, 252, 287, 54; 348/461, 463, 465, 467

(56) References Cited

U.S. PATENT DOCUMENTS 5,134,496 A * 7/1992 Schwab et al. ............. 358/335
5,319,453 A * 6/1994 Copriviza et al. ............. 348/6
5,404,160 A * 4/1995 Schober et al. ................ 348/1
5,991,426 A * 11/1999 Cox et al. .................. 382/100
6,373,960 B1 * 4/2002 Conover et al. ............ 382/100

OTHER PUBLICATIONS

Tsang, K.F. et al., "Robust and High Quality Video Watermarking with the use of Temporal Redundancy," *Proc. SPIE vol. 4314 Security and Watermarking of Multimedia Contents III*, Jan. 2001, pp. 55–63.*

Lim, J.H. et al., "Digital Video Watermarking Using 3D-DCT and Intra-Cubic Correlation," *Proc. SPIE vol. 4314: Security and Watermarking of Multimedia Contents III*, Jan. 2001, pp. 64–72.*

* cited by examiner

Primary Examiner—Andrew W. Johns
(74) Attorney, Agent, or Firm—William J. Burke (57) ABSTRACT

A channel is inserted into a sequence of frames for an image, by varying one or more display characteristics across a display in accordance with a spatio-temporal pattern applied to, for example, successive lines of each modified frame. The channel may be employed to watermark the image, and the watermark may be defined as W(x) and its complement [1−W(x)] in counter-phase rotations of successive lines in pairs of frames. The watermark information is applied in relatively still portions of the image with sufficient lightness level. A receiver includes a watermark detector that has a priori information about the watermark. The watermark detector examines specific regions of the displayed image over time, and tests the regions for the watermark during time intervals when the image remains relatively still.

40 Claims, 4 Drawing Sheets

SPATIO-TEMPORAL CHANNEL FOR IMAGES EMPLOYING A WATERMARK AND ITS COMPLEMENT

This is a continuation-in-part of U.S. patent application Ser. No. 09/656,892, filed on Sep. 7, 2000.

BACKGROUND OF THE INVENTION

1. Field of the Invention

The present invention relates to image processing, and, more particularly, to a channel for data transmission in, or watermarking of, video signals.

2. Description of the Related Art

Image information is commonly processed, recorded, and/or stored in either analog or digital format, but ultimately any information recorded in an analog format may be translated into a digital format. Once in digital format, such information is easily copied, modified, or distributed through electronic media such as the Internet. While protection by copyright may be available to owners of the information once fixed in tangible media, theft through unauthorized copying, modification, or distribution of the information when it is in digital format is 1) easily accomplished and 2) difficult to detect from the information itself. For example, theft of compressed digital content (e.g., digital videodisk (DVD), digital broadcast, or digital cinema) is a serious concern to owners and providers authorized to distribute the compressed digital content. While the digital format allows for "perfect" copies of the compressed digital content, techniques exist to hide information within the compressed digital content that may be used to prove rightful ownership or use, such as in a court of law.

Collectively, these techniques are within the field of data verification, and for encoded and/or compressed digital image content, digital watermarking is commonly employed to insert hidden information directly into the image video signal. Many watermarking techniques for digital images have been developed that allow content providers to prove the origin of their material and that their material was copied, modified, or distributed. In addition, published techniques exist for inserting invisible watermarks into video data, and the Copy Protection Technical Working Group (CPTWG) of the DVD forum, for instance, may select a standardized digital watermarking technique for DVD's.

For some systems, a separate data channel superimposed on the transmitted video signal may aid in data verification. The data channel may be added within the encoded video signal data stream itself, or the data channel may be sent separately in secondary channels used for system control, signaling, and/or synchronization information. The channel may be used to carry data corresponding to an encryption key, watermark pattern, or other form of identifier unique to an authorized owner or distributor of the image content.

Some watermarking techniques exploit a human's insensitivity to high spatial and/or temporal frequencies, and insert low-level watermarks with these characteristics. As is known in the art, both electronic displays and film projectors tend to have display characteristics that vary from the center to the sides of the image. However, a human's visual perception is such that most humans observing the image tolerate and accept these subtle variations. Because the changes in the display characteristic(s) are slight, most viewers are not aware when a display characteristic changes over time.

In many of the techniques for encoded or compressed digital images, the watermark is "stamped" into the image by modifying either the (analog) pixels themselves, or on selected bit values of the (digital) pixel color component values (e.g., the red, green, and blue (RGB) components). Watermarks inserted with such techniques are generally degraded or destroyed by common image signal processing methods that are applied to the digital image information, such as scaling, cropping, rotation, and compression. Furthermore, techniques for relatively high bit-rate watermarking tend to be more visible in the watermarked image and more susceptible to subsequent signal processing.

Unfortunately, the watermarks of these techniques tend to be degraded or obliterated completely when the image is resized (specifically, reduced in size) or compressed by commonly used algorithms such as those specified in the MPEG-1 or MPEG-2 standards. Furthermore, the rapid variations associated with the watermark are often interpreted as noise by signal processing algorithms compressing the image data, which tends to lower the efficiency of compression algorithms. Other pixel-domain watermarking techniques specifically target edges of objects in the image as a means for inserting a watermark or hiding data. However, since data compression algorithms such as those employed in MPEG-2 systems introduce noise at object edges, a similar degradation or obliteration of the watermark may occur.

SUMMARY OF THE INVENTION

The present invention relates to a channel allowing for watermarking of an image or data transmission within an image. The presence of the channel itself may be considered as the watermark, or the watermark may be represented by data carried in the channel. The channel is inserted into the image by varying display characteristics of the image across the display in accordance with a predefined spatio-temporal pattern. Variation of a display characteristic for preferred embodiments is based on a predefined spatio-temporal pattern within pixel pairs, pixel lines, pixel columns, or pixel diagonals of an image frame. For some embodiments the spatio-temporal pattern and a corresponding, complementary pattern are applied to corresponding successive pairs of such frames.

In one exemplary embodiment, a watermark is added to a video signal representing an image. The watermark is added by (a) applying a first watermark function to a first set of pixels in a first frame; and (b) applying a complement of the first watermark function to a second set of pixels in the first frame. In a further embodiment the relative positioning of the first and second sets of pixels tends to mask visibility of the watermark in the first frame.

In another exemplary embodiment, a watermark is detected in a video signal representing an image. The watermark is detected by (a) identifying first and second sets of pixels in a first frame; (b) calculating a first difference value for the first and second sets of pixels; and (c) determining whether the watermark is present based on the first difference value. When the watermark is present, the first difference value is related to prior application of a first watermark function to the first set of pixels and prior application of a complement of the first watermark function to the second set of pixels. In a further embodiment relative positioning of the first and second sets of pixels tends to mask visibility of the watermark in the first frame.

BRIEF DESCRIPTION OF THE DRAWINGS

Other aspects, features, and advantages of the present invention will become more fully apparent from the following detailed description, the appended claims, and the accompanying drawings in which:

DETAILED DESCRIPTION

In accordance with embodiments of the present invention, a channel is inserted into an image by varying a display characteristic of the data representing the image based on a predefined spatio-temporal pattern. The predefined spatio-temporal pattern is applied to, for example, pixel pairs, pixel rows, pixel columns, or pixel diagonals (termed herein "lines") of an image frame. The channel may be a signal that corresponds to, for example, 1) a predefined mathematical pattern; 2) a sequence of pattern states, 3) a cyclic pattern, or 4) a random pattern corresponding to an identification key. For the described preferred embodiments, a display characteristic of the image is varied in a fashion that is difficult to detect visually by a human but may be detected by a processor based on a priori knowledge of the channel and/or watermark.

As described herein, the channel is applied to a video signal comprising a sequence of frames. The sequence of frames, when displayed, forms an image displayed over time, and for the described, preferred embodiments, the term "image" refers to an image that may remain still or may change over time. The term "still image" refers to an image formed from a sequence of frames in which there is little or no movement from frame to frame. The term "moving image" refers to an image formed from a sequence of frames in which objects within regions of the image change significantly over time. One skilled in the art would realize that use of these terms is for clarity, and use of these terms in the following description does not limit the present invention.

Figure 1:
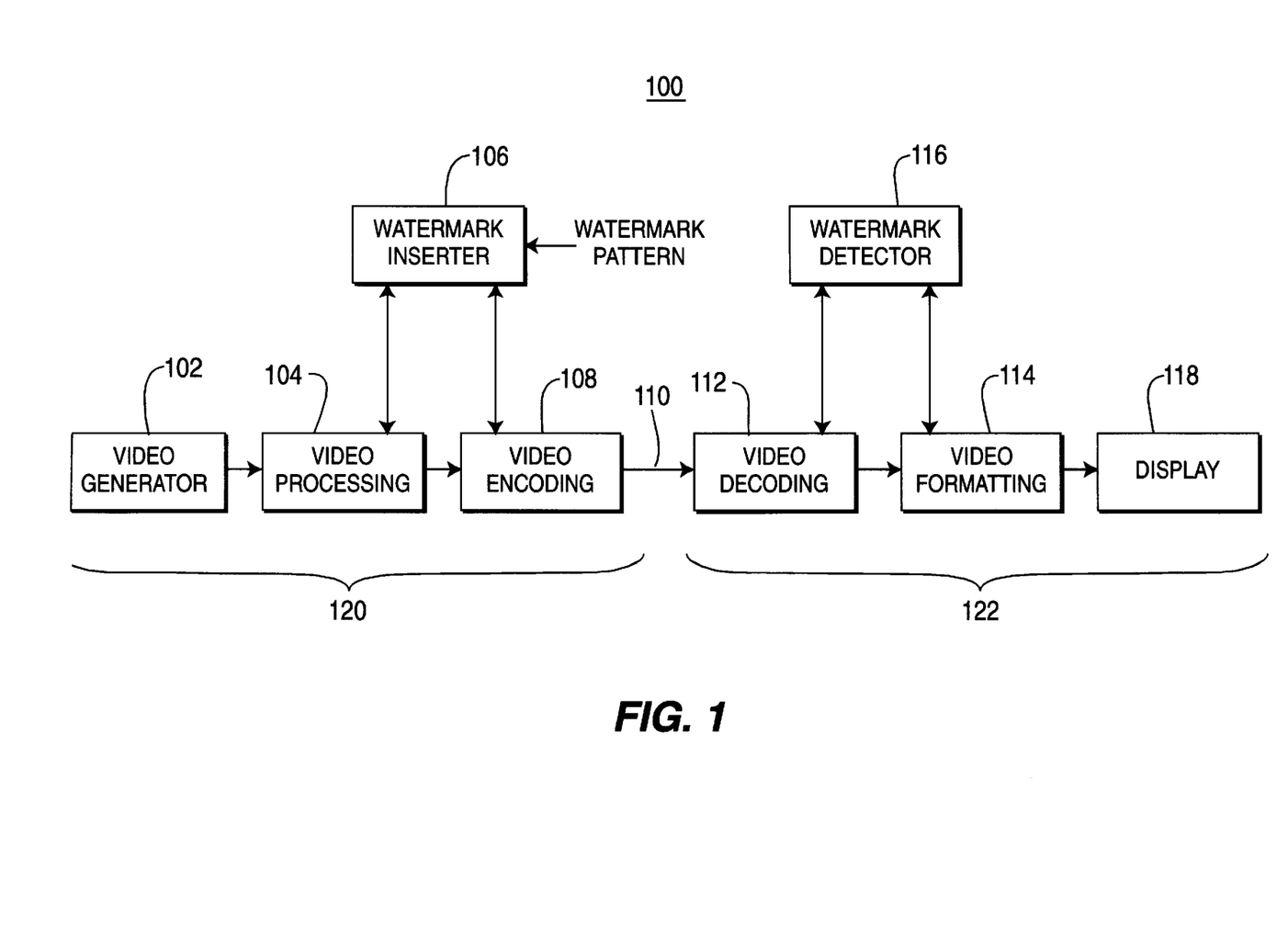
FIG. 1 shows a video system that inserts and detects watermarks in accordance with exemplary embodiments of the present invention.

FIG. 1 shows a video system 100 that inserts and detects watermarks in accordance with exemplary embodiments of the present invention. Video system 100 includes i) transmitter 120 generating video signals with a channel formed in accordance with exemplary embodiments of the present invention for watermarking an image, and ii) receiver 122 detecting the watermark in a received video signal.

Video generator 102 of transmitter 120 may be a video camera, a computer, or similar device configured to generate a video signal representing a recorded image. Video generator 102 may scan the image to generate a video signal of frames comprising red, green, and blue (RGB) components of pixels representing the scanned image. The video signal is provided to a video-processing module 104. Video processing module 104 may provide signal processing, either in the analog or digital domain, that samples the video, compensates for variations that arise during scanning, or performs similar types of image processing known in the art.

Video encoding module 108 may be employed to generate compressed or encoded video signals in accordance with, for example, high definition television standards such as MPEG-2. Watermark inserter 106 is coupled to one or both of the video processing and video encoding modules 106 and 108 to insert a channel for watermark information into the image represented by the video signal.

Watermark inserter 106 modifies, for example, one or more of the color components (e.g., the red, green, and blue (RGB) components) of pixels of the image as described subsequently. A human's visual perception is relatively insensitive to short-wave light variations, such as variations in the blue component of the video signal. In addition, the short-wave sensory neuron is insensitive to signals of high spatial frequency as described in, for example, K. T. Mullen, "The contrast sensitivity of human colour vision to red-green and blue-yellow chromatic gratings," J. Physiol. vol. 359 (1985), pp 381–400.

In accordance with the exemplary embodiments described herein, the blue component is varied with a relatively high-frequency watermarking function in both space and in time. The hue of the color information (specifically, the "bluishness" or "blue-lightness") alternates between lines of selected frames, and also changes between frames over time. The watermarking function employs a stream of watermark values $W(x,y)$ or its complement $[\sim W(x, y)]$, where x is the spatial coordinate along a line y (e.g. pixel located at column x along a given row y). For convenience, the "y" coordinate is dropped in the following description. The watermark value $W(x)$ is a specified value, and the complement $[\sim W(x)]$ may be defined as a quantity that is a linear function based on the specified value $W(x)$. For the described embodiment, $W(x)$ is either a 1 or a 0, and the complement $[1-W(x)]$ is the opposite value (i.e., if $W(x)$ is 1, then the $[1-W(x)]$ is 0, and if $W(x)$ is 0, then $[1-W(x)]$ is 1).

If a pattern formed from $W(x)$ and $[\sim W(x)]$ is applied to pixels of successive lines in an image during one frame, the reverse pattern may be applied to pixels of corresponding successive lines in a successive frame. Modifying successive lines in an alternating fashion between the watermark value and its complement, and similarly alternating between the pattern and the reverse pattern in successive frame pairs, tends to smooth out variations from the watermark (watermark artifacts) visible to the human eye.

Some embodiments of the present invention may apply the watermark information directly to successive frames of a video signal before subsequent signal processing (termed herein as the pre-encoding stage), such as application of transmission encoding and compression. Other embodiments of the present invention apply the watermark information directly to an encoded video signal (termed herein as the post-encoding stage) by, for example, modifying DCT coefficients in the encoded video signal.

The watermark value $W(x)$ or its complement $[\sim W(x)]$ is added to the least significant bit of the component sample value of the corresponding pixel, which component may be representing either the blue color component of the pixel (which may be expressed as component B, V, Cb, or Pb) or a selected DCT coefficient of the pixel related to the blue component. One skilled in the art would realize that the watermark value and its complement may be applied to the pixel in other ways, such as by a XOR addition.

For a preferred embodiment of the present invention, watermarking is applied as counter-phase perturbations of successive lines in a B-frame. Some embodiments may apply the reverse of the pattern in the next B-frame. Watermarking B-frames constrains decoding errors so they do not propagate through other frames when the image of the video data stream is subsequently encoded and decoded. The use of B-frames allows for relative ease in implementation in video encoding systems since B-frames often occur in successive pairs.

Figure 2:
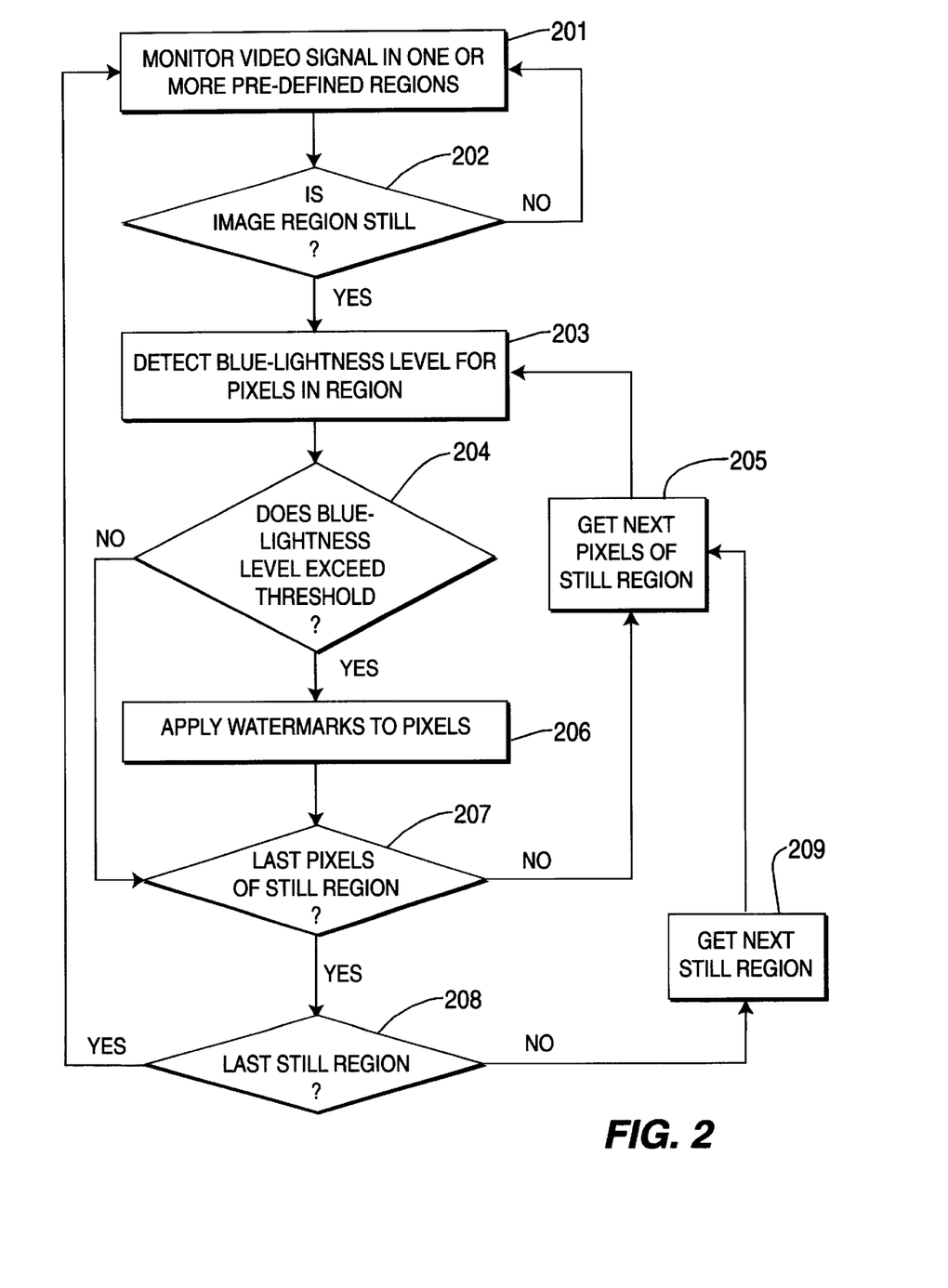
FIG. 2 shows an exemplary method of inserting a watermark into an image in accordance with an exemplary embodiment of the present invention.

FIG. 2 illustrates an exemplary method of watermarking an image in accordance with an exemplary embodiment of the present invention. At step 201, watermark inserter 106 monitors the video signal (either in the pre-encoding stage 104 or the post-encoding stage 108 of FIG. 1) in predefined regions. Step 202 tests the monitored regions to detect sequences of frames in which one or more pre-defined regions of the image are relatively still. Testing component values in pre-defined portions of the image with the sum of absolute difference (SAD) technique, or with some other similar integration of differences, may provide a measure of the relative rate of change of pixel values within each region. For the described embodiment, the color component(s) are sampled in each frame and SAD values calculated between frames.

Figure 3:
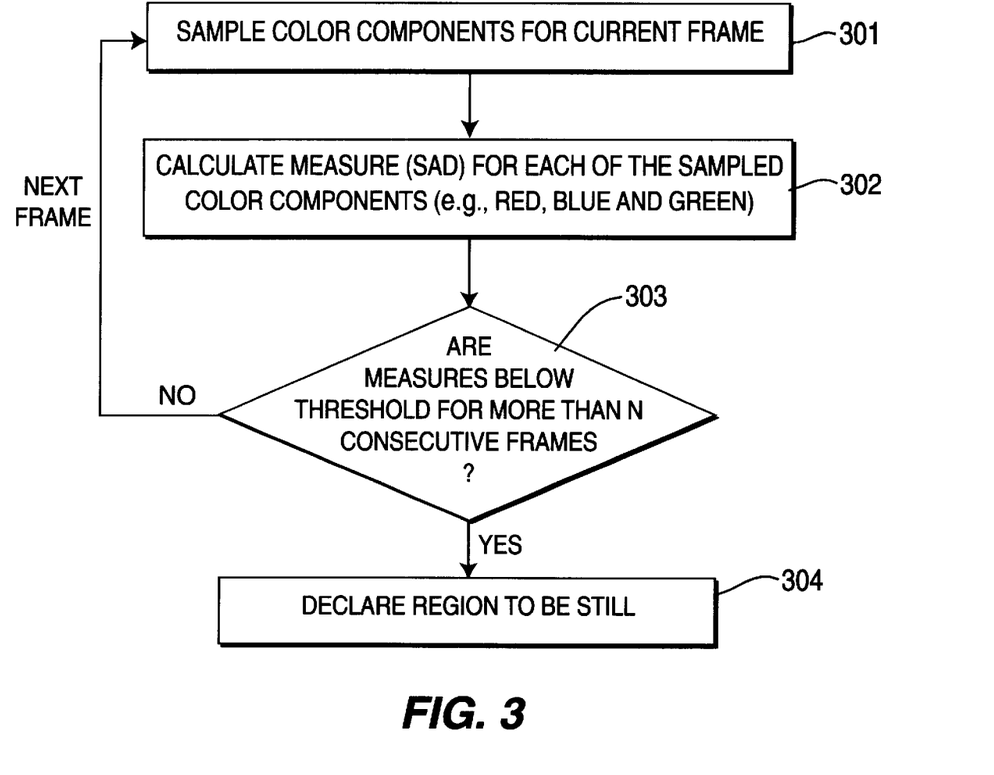
FIG. 3 shows an exemplary method of identifying still regions in an image as employed by the video system of FIG. 1.
Figure 4:
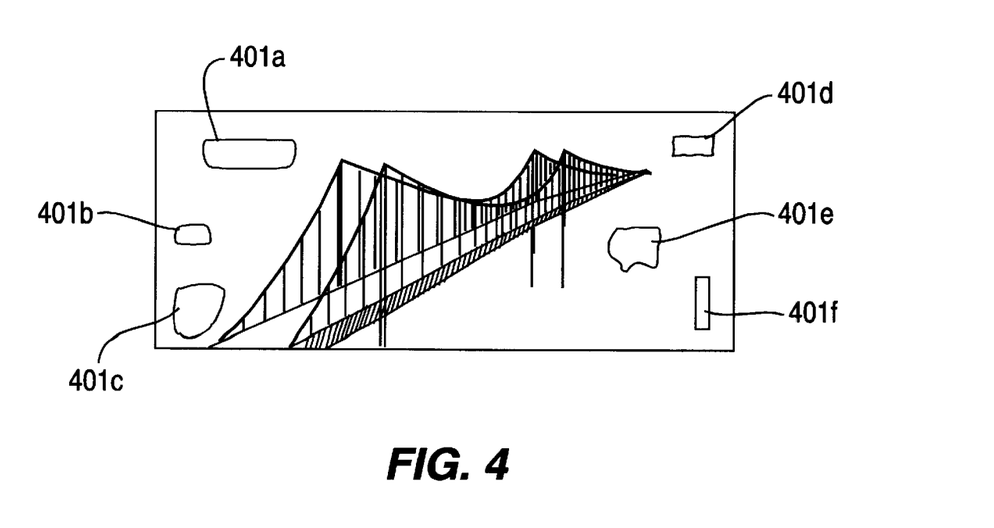
FIG. 4 shows analysis regions of an image watermarked in accordance with an exemplary embodiment of the present invention.

An exemplary method of identifying still regions of an image employed by, for example, watermark inserter 106 and step 202 of FIG. 2 is shown in FIG. 3. For example, at step 301 one or more color components are sampled over a frame. As shown in FIG. 4, several specific regions 401a–401c and 401d–401f along the left and right edges, respectively, of an image may be independently analyzed for stillness. At step 302, the SAD is calculated for the sampled color components as a measure of "stillness" in the image in each of the left and right regions 401a–401c and 401d–401f.

At step 303 a test determines whether the SAD values remain below a threshold over a pre-determined number of frames (e.g., N frames, N a positive integer). If the test of step 303 determines that the measure has not remained below the threshold for more than N frames, the method returns to step 301. If the test of step 303 determines that the measure remains below the threshold for more than N frames, at step 304 the region is determined to be "still".

Returning to FIG. 2, if the test of step 202 determines that no image region is relatively still in the current frame, the method returns to step 201. Otherwise, if at step 202 at least one image region is declared relatively still, at step 203 the blue-lightness component is detected for each of the set of pixels (e.g., on successive pairs of lines) in the region declared still. At step 204, a test is made to determine if a threshold level of blue-lightness is exceeded by the blue-lightness component of the corresponding pixel.

If either the sample value of the blue color component or the corresponding DCT coefficient value is relatively small, modifying the value may result in a visible artifact in the watermarked image. Thus, the threshold level of blue-lightness is determined such that the color or DCT coefficient value has a relatively small percentage change when modified by the watermark value to reduce the possibility of visual detection of the watermark. In general, the flame is considered to be "bright" when a threshold of lightness, or other form of intensity, is exceeded in a predefined portion of the image for either a frame or group of frame. A bright frame may be defined for at either a pixel, groups of pixels, frame region, or frame level.

If the test of step 204 determines that the threshold level of blue-lightness is not exceeded, the method advances to step 207 to determine if more pixels remain for watermarking. If the test of step 204 determines that the threshold level of blue-lightness is exceeded, the image is declared to be bright, and the method advances to step 206. At step 206, since the image is relatively still and the blue-lightness threshold is exceeded, watermark inserter 106 applies the pattern of watermark values W(x) and [1−W(x)] on either a pixel-by-pixel basis if the watermark is inserted in the pre-encoding stage or on a DCT block-by-block basis if the watermark is inserted in the post-encoding stage. The watermark value W(x), or its complement [1−W(x)], is added to the least-significant value of the component value if the blue-lightness threshold is exceeded. The preferred embodiment of the present invention applies the watermark value or its complement to the pixels that meet the blue-lightness threshold test of step 204 within the selected lines included within the still region.

Step 207 determines whether more values for pixels in the still region remain to be watermarked. If the test of step 207 determines more pixel values remain to be watermarked, the method advances to step 205; otherwise the method advances to step 208. A test of step 208 determines whether more still regions remain for watermarking, and, if so, the method advances to step 209 to get pixels of the next still region. Otherwise, if the test of step 208 determines that no more still regions remain in the current frame for watermarking, the method returns to step 201 for the next frame.

When the watermark is inserted in the post-encoding stage, the watermark value W(x) and its complement [1−W(x)] are applied as counter-phase perturbations of a pre-selected DCT coefficient of successive encoded lines in a B-frame. Once encoded, a group of 8 rows of pixels is encoded as a series of 8×8 blocks of DCT coefficients. A pre-selected DCT coefficient in each successive encoded block is modified by the watermark W(x) for image regions that exceed the threshold of blue lightness and are relatively still. The pre-selected DCT coefficient is desirably selected such that its spatial frequency 1) does not produce a perceptible blue signal, and 2) its coarseness of quantization does not prevent proper perturbation by the watermark. Therefore, preferred embodiments may employ the DCT coefficient at the 3rd row and 3rd column (i.e., the (2,2) DCT coefficient) of an 8×8 block for modification by the watermark value.

If watermark insertion occurs during the post-encoding stage, a threshold level of blue-lightness (e.g., as used in step 204 of FIG. 2) of 2 digital-value units may be used so that watermark-induced artifacts may be sufficiently invisible to human perception. Various different computations for a blue-lightness value that is compared with the threshold level may be employed. For example, the blue-lightness value may be set as the arithmetic mean of a particular DCT coefficient corresponding to two successive lines in the encoded blocks. For example, the arithmetic mean may be calculated for the DCT coefficient values in the following blocks at line L and row position x: line L at time t, line L+1 at time t, line L at time t+1, line L+1 at time t+1.

Returning to FIG. 1, receiver 122 of system 100 receives watermarked video signal 110 generated by transmitter 120. Receiver 122 of system 100 may decode the video signal with video decoding module 112. Video decoding module 112 may be used to reconstruct data representing the video signal from a packet stream, reverse digital line encoding and/or compression, and format the image in accordance with a standard, such as the MPEG-2 standard. Further digital/analog processing of the reconstructed, watermarked image (e.g., formatting, cropping, rotation, and/or color information modification) may be performed by video formatting module 114 prior to providing the video signal to display 118. Display 118 may be a standard optical projector, electronic projector, or CRT converting the color information in the video signal to pixels on the screen of display 118 to provide the image to a viewer.

Receiver 122 includes watermark detector 116 to detect the (watermark) channel in a received video signal. Watermark detector 116 extracts the watermark information. Watermark detector 116 may then demodulate data from the channel, if present, and may verify origin and integrity of the received image based on either the watermark information or the demodulated data. Since the channel is inserted as an operation over both space and time, watermark detector 116 may employ techniques based on a priori knowledge of the watermark to detect the presence, absence, or modification of the watermark.

Detecting the presence of a function in one or more components is more difficult when objects in the image are moving in time, or the image is undergoing a zoom or pan in time. As would be apparent to one skilled in the art, many feature-length films, documentaries, commercials, and studio productions include image portions that remain relatively still for periods lasting for one or more seconds and that are distributed throughout the sequence of frames of the video signal. Consequently, detection of the watermark comprises two operations: 1) detection of a sequence of frames in which the image, or portions of the image, remain relatively still; and 2) detecting the watermark itself within regions of the portion of the image that are detected as being relatively still.

Figure 5:
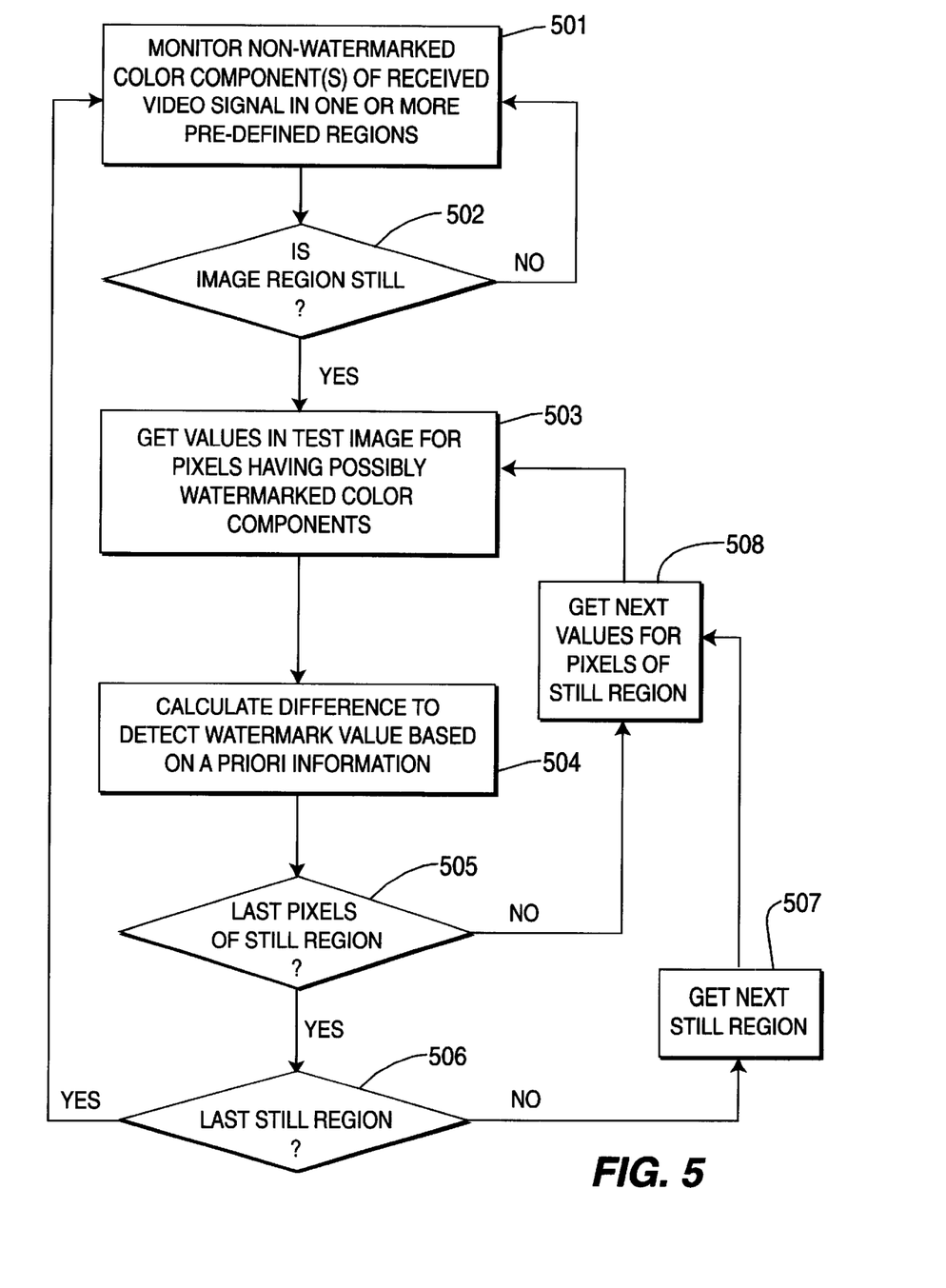
FIG. 5 shows an exemplary method of detecting a watermark in an image in accordance with an exemplary embodiment of the present invention.

To detect whether portions of the image are relatively still, watermark detector 116 detects differences in the frame color information for pre-defined regions of the image between frames to determine whether they may be declared as being "still". Watermark detector 116 knows a priori that the blue color component is watermarked and generally processes the remaining non-watermarked color component (s) for stillness determination. An exemplary method of watermark detection by watermark detector 116 including these two operations is shown in FIG. 5.

For example, at step 501, non-watermarked color components in pre-determined regions such as shown in FIG. 4 are sampled over a frame. At step 502, the method determines whether one or more regions of the image are still by a method similar to that employed by watermark inserter 106 described with respect to FIG. 3. At step 502, SAD values of non-watermarked color components are compared to a corresponding threshold over a pre-determined number of frames (e.g., N frames, N a positive integer). For the described embodiment, the non-watermarked color components (e.g., the green/red components for the exemplary implementation) are sampled in each frame and SAD values calculated between frames. If the test of step 502 determines that the measure for the region has not remained below the threshold for N consecutive frames, the method returns to step 501. Otherwise, the region is determined to be "still" (i.e., objects of the image region are moving slowly enough through time for accurate watermark detection) and method advances to step 503.

To detect the watermark itself, watermark detector 116 begins processing the pixels in the image frame. At step 503, the possibly watermarked component, either the blue component or the corresponding DCT coefficient value, for the pixels in the one or more of the regions (e.g., regions 401a–401c and 401d–401f of FIG. 4) that were determined to be "still" are retrieved. At step 504, a difference is calculated from the values retrieved at step 503 based on a priori information about the watermarking process that identifies one of four cases, in addition to a priori knowledge of the particular color component including the watermark information.

Step 504 generates the difference for one of four different cases of watermarking that may be present in the received image. These four cases arise depending on whether the image is watermarked in the pre-encoding stage or post-encoding stage, and whether watermark detector 116 has a non-watermarked image available to compare with the received, watermarked frame. Processing implemented by step 503 for these four cases may be as follows.

For the first case of processing, the original, non-watermarked image is available to the watermark detector 116, and the watermark is inserted into the frames in the pre-encoding stage. For this first case, watermark detection may be on a frame-by-frame basis, and the watermark information in successive B-frames may be independent of one another. For example, the watermark value at horizontal position x on vertical position y (e.g., line y, with y an integer and $0 \leq y$) is $W(x)$, and the watermark at position x on line y+1 is $[1-W(x)]$. The watermark is extracted by evaluating the difference of the color component value of the pixel at (x,y) in the received and possibly watermarked ("test") image frame ($BV_T(x,y)$) with the color component value of the pixel at (x,y) in the non-watermarked ("reference") image frame ($BV_R(x,y)$). The difference calculated for line y is the watermark value, and the difference calculated for line y+1 is the complement of the watermark value. Since the watermark value and its complement are available after calculating the respective differences for the pair of lines, duplicate information is available that may allow for a certain level of error detection/correction in the watermark detection process.

For the second case of processing, the original, non-watermarked image is available to the watermark detector 116, and the watermark is inserted into the frames in the post-encoding stage. For this second case, detection may be on a frame-by-frame basis, and the watermarks on successive B-frames may be independent of one another. If the selected (2,2) DCT coefficient in each 8×8 block of each B-frame is modified in accordance with the watermark value ($W(x)$ or its complement $[1-W(x)]$), the processing is similar to that of the first case just described. The watermark is extracted by evaluating the difference of the (2,2) DCT coefficient at (x,y) in the test image encoded B-frame ($BD_T(x,y)$) with the (2,2) DCT coefficient at (x,y) in the non-watermarked image encoded B-frame ($BD_R(x,y)$). For the second case, x is the horizontal block number, y is the vertical block number, and ($BD_T(x,y)$) or ($BD_R(x,y)$) is the value of the (2,2) DCT coefficient in the corresponding (x,y) block. As with the first case, duplicate watermark value information may be available allow for a certain level of error detection/correction in the watermark information.

For the third case of processing, the original, non-watermarked image is not available to the watermark detector 116, and the watermark is insert into the B-frames in the pre-encoding stage. For the third case, detection may be on pairs of B-frames. The watermark value at horizontal position x on line y is $W(x)$, and the watermark value at position x on line y+1 is its complement $[1-W(x)]$. The watermark value is extracted by calculating $[BV_T(x,y,z)+BV_T(x,y+1,z+1)]-[BV_T(x,y,+1,z)+BV_T(x,y,z+1)]$, with $BV_T(x,y,z)$ being the color component of the pixel evaluated at horizontal position x, vertical position y, and B-frame z of the test image.

For the fourth case of processing, the original, non-watermarked image is not available to the watermark detector 116, and the watermark is inserted into the B-frames in the post-encoding stage. For the fourth case, detection may be on pairs of B-frames. If the (2,2) DCT coefficient in each 8×8 block of each MPEG B-frame is modified by a watermark value, the watermark value at horizontal position x on line y of the test image is W(x), and the watermark at position x on line y+1 is [1−W(x)]. The watermark value is extracted by calculating $[BD_T(x,y,z)+BD_T(x,y+1,z+1)]-[BD_T(x,y+1,z)+BD_T(x,y,z+1)]$, where x is the horizontal block number, y is the vertical block number, and $BD_T(x,y,z)$ is the value of the (2,2) DCT coefficient in the (x,y) block of B-frame z of the encoded test image.

Returning to FIG. 5, once the watermark values are extracted, if the test of step 505 determines more pixels of the still region remain to detect watermark values, the method advances to step 508 to get the next values; otherwise the method advances to step 506. A test of step 506 determines whether more still regions remain for watermark extraction, and, if so, the method advances to step 507 to get the next still region. From step 507, the method advances to step 508 to begin processing of values for the pixels of the next still region. Otherwise, if the test of step 506 determines that no more still regions remain in the current frame for watermarking, the method returns to step 501 for the next frame.

For the described implementation, variation based on the watermark information is applied to the blue component to subtly change the hue of the color information in predetermined regions of the image. This technique may be extended to apply watermark information to several components of the video signal. One skilled in the art would realize that other types of signal components, such as U, Cr, or Pr components (or other components derived from the RGB components of the video signal) may be modified.

For the described embodiment, W(x) is either a 1 or a 0, and the complement [1−W(x)] is the opposite value. However, the present invention is not so limited and one skilled in the art would realize that other definitions for W(x) and it's complement [~W(x)] may be employed. For example, W(x) may be set as "1" and [~W(x)] may be set as "−1", or W(x) may vary between 0 and 1, with [~W(x)] being a constant K minus W(x). While the following preferred embodiment is described for W(x) being a fixed value for each value of x in a line, one skilled in the art would realize that the watermark value or its complement may vary across the line dependent upon x. Such variation may correspond to data values of a superimposed data channel.

The preferred embodiments of the present invention apply the watermark value or its complement to the pixels that meet the blue-lightness threshold test of step 204 within the selected lines included within the still region. However, the watermark value or its complement may be applied to all pixels within a line or as a subset of pixels in a line not necessarily included in a region declared to be still. In addition, while the present invention has been described for inserting a watermark value and its complement in successive lines, one skilled in the art would realize that the present invention may be used for pixel sets in lines that are relatively closely spaced but not necessarily successive lines. During the watermark detection process averaging the difference values calculated along a line may improve performance. Similarly, if the same watermark value and its complement are applied over several pairs of successive lines, averaging these results over the several pairs of successive lines may also improve performance of the detection process.

By repeating application of the watermark in different sets of pixels throughout each frame, the effectiveness of the watermark may be increased. Thus, if the watermark is applied throughout the image, a detector may identify which regions of the image have been modified. Further, if the watermark function is varied in different regions of each image, unauthorized detection of the watermark through correlation techniques may be prevented.

The a priori information known to receiver 122 for the preferred embodiment is that the watermark is applied to at least one color component (in the pre-encoding stage or post-encoding stage) in successive lines (or columns or diagonals). Typically, a priori information may also include the particular color component that contains the watermark and whether the watermark is applied in the pre-encoding stage or post-encoding stage. For the described embodiments, as is known in the art, red, green, and blue components of images tend to be highly correlated both spatially and temporally. For most detection events, the red and green components remain relatively constant while the blue component varies over time in accordance with the embedded watermark information. Thus, which color component containing watermark information may be deduced by monitoring all color components, and selecting the color component(s) which appear to have more variation than others do. Additional a priori information may include a copy of the original non-watermarked image, termed a reference image.

The preferred embodiments described herein are described for the purpose of applying watermark information to the image, although the present invention is not so limited and may be employed to provide a separate data channel. The presence of the channel may be considered as a watermark, or data carried within the channel may correspond to watermark information. Watermark information, when extracted at a receiver, may be used to identify the origin of the image data, ownership of the image data, or whether the image data is modified or otherwise corrupted. In addition to image origination and verification systems, the present invention may be applied to systems for copy management, advertisement integrity, or steerable encoding.

The present invention can be embodied in the form of methods and apparatuses for practicing those methods. The present invention can also be embodied in the form of program code embodied in tangible media, such as floppy diskettes, CD-ROMs, hard drives, or any other machine-readable storage medium, wherein, when the program code is loaded into and executed by a machine, such as a computer, the machine becomes an apparatus for practicing the invention. The present invention can also be embodied in the form of program code, for example, whether stored in a storage medium, loaded into and/or executed by a machine, or transmitted over some transmission medium, such as over electrical wiring or cabling, through fiber optics, or via electromagnetic radiation, wherein, when the program code is loaded into and executed by a machine, such as a computer, the machine becomes an apparatus for practicing the invention. When implemented on a general-purpose processor, the program code segments combine with the processor to provide a unique device that operates analogously to specific logic circuits.

It will be further understood that various changes in the details, materials, and arrangements of the parts which have been described and illustrated in order to explain the nature of this invention may be made by those skilled in the art without departing from the principle and scope of the invention as expressed in the following claims.

What is claimed is:

1. A method for adding a watermark to a video signal representing an image, the method comprising the steps of:

(a) applying a first watermark function to a first set of pixels in a first frame;
(b) applying a complement of the first watermark function to a second set of pixels in the first frame.
(c) applying the complement of the first watermark function to a first set of pixels in a second frame corresponding to the first set of pixels of the first frame; and
(d) applying the first watermark function to a second set of pixels in the second frame corresponding to the second set of pixels of the first frame,
wherein the application of the first watermark function and the complement of the first watermark function in steps(a) through (d) tends to mask visibility of the watermark between the first and second frames.

2. The invention of claim 1, wherein relative positioning of the first and second sets of pixels tends to mask visibility of the watermark in the first frame.

3. The invention of claim 1, wherein the watermark is added to only B frames.

4. The invention of claim 1, wherein the watermark is added to only B frames.

5. The invention of claim 1, wherein the first and second sets of pixels are adjacent to one another in the first frame.

6. The invention of claim 1, wherein the first watermark function is applied to a color component of each pixel in the first set of pixels and the complement of the first watermark function is applied to a corresponding color component of each pixel in the second set of pixels.

7. The invention of claim 1, wherein the first watermark function is applied to a transform coefficient corresponding to a color component of each pixel in the first set of pixels and the complement of the first watermark function is applied to a corresponding transform coefficient corresponding to a corresponding color component of each pixel in the second set of pixels.

8. The invention of claim 1, further comprising the steps of:
(c) applying a second watermark function to a third set of pixels in the first frame; and
(b) applying a complement of the second watermark function to a fourth set of pixels in the first frame, wherein relative positioning of the third and fourth sets of pixels tends to mask visibility of the watermark in the first frame.

9. The invention of claim 8, wherein the first watermark function is the same as the second watermark function.

10. The invention of claim 1, wherein the watermark is added only to frames determined to be still when one or more regions in the frame are determined to be still.

11. The invention of claim 1, wherein the watermark is added only to frames determined to be bright when one or more regions in the frame are determined to be bright.

12. The invention of claim 11, wherein the watermark is added only to pixels that are bright in bright frames.

13. The invention of claim 1, wherein the first watermark function and the complement of the first watermark function represent data of a data stream encoded into the watermark.

14. The invention of claim 1, further comprising the steps of repeating steps (a) and (b) for at least one other watermark function in different sets of pixels.

15. The invention of claim 1, wherein application of the first watermark function varies a display characteristic over the first set of pixels and application of the complement of the first watermark function varies the display characteristic over the second set of pixels, wherein the variations of the display characteristic over the first and second sets of pixels tend to mask the visibility of the watermark in the first frame.

16. The invention of claim 1, wherein step (a) applies the first watermark function and step (b) applies the complement of the first watermark function to pixel components conveying blue color information.

17. The invention of claim wherein 16 pixel components conveying blue color information are at least one of B, V, Cb, or Pb components.

18. A method of detecting a watermark in a video signal representing an image, the method comprising the steps of:
(a) identifying first and second sets of pixels in a first frame;
(b) calculating a first difference value for the first and second sets of pixels; and
(c) determining whether the watermark is present based on the first difference value, wherein, when the watermark is present, the first difference value is related to prior application of a first watermark function to the first set of pixels and prior application of a complement of the first watermark function to the second set of pixels, and wherein:
step (a) further comprises the step of identifying corresponding first and second sets of pixels in a second frame;
step (b) further comprises the step of calculating a second difference value for the corresponding first and second sets of pixels in the second frame; and
step (c) further comprises the step of determining whether the watermark is present based on the second difference value, wherein, when the watermark is present, the second difference value is related to prior application of the complement of the first watermark function to the first set of pixels in the second frame and prior application of the first watermark function to the second set of pixels in the second frame,
wherein the prior application of the first watermark function and the complement of the first watermark function to the first and second sets of pixels in the first and second frames tends to mask visibility of the watermark between the first and second frames.

19. The invention of claim 18, wherein relative positioning of the first and second sets of pixels tends to mask visibility of the watermark in the first frame.

20. The invention of claim 18, wherein the first and second frames are successive frames.

21. The invention of claim 18, wherein the watermark is added to only B frames.

22. The invention of claim 18, wherein the first and second sets of pixels are adjacent to one another in the first frame.

23. The invention of claim 18, wherein the first watermark function is applied to a color component of each pixel in the first set of pixels and the complement of the first watermark function is applied to a corresponding color component of each pixel in the second set of pixels.

24. The invention of claim 23, wherein the color component conveys blue color information.

25. The invention of claim 24, wherein the color component is at least one of B, V, Cb, or Pb components.

26. The invention of claim 18, wherein the first watermark function is applied to a transform coefficient corresponding to a color component of each pixel in the first set of pixels and the complement of the first watermark function is applied to a corresponding transform coefficient corresponding to a corresponding color component of each pixel in the second set of pixels.

27. The invention of claim 18, wherein:
step (a) further comprises the step of identifying third and fourth sets of pixels in the first frame;
step (b) further comprises the step of calculating a second difference value for the third and fourth sets of pixels; and
step (c) further comprises the step of determining whether the watermark is present based on the second difference value, wherein, when the watermark is present, the second difference value is related to prior application of a second watermark function to the third set of pixels and prior application of a complement of the second watermark function to the fourth set of pixels,
wherein relative positioning of the third and fourth sets of pixels tends to mask visibility of the watermark in the first frame.

28. The invention of claim 27, wherein the first watermark function is the same as the second watermark function.

29. The invention of claim 27, wherein relative positioning between the first and second sets of pixels and the third and fourth sets of pixels tends to mask visibility of the watermark in the first frame.

30. The invention of claim 27, wherein the first, second, third, and fourth sets of pixels are adjacent to one another.

31. The invention of claim 18, wherein the watermark is detected only in frames determined to be still, wherein a frame is still when one or more regions in the frame are determined to be still.

32. The invention of claim 18, wherein step (c) further comprises the step of interpreting data of a data stream encoded in the watermark based on the first difference value.

33. The invention of claim 18, wherein step (b) comprises the step of calculating the first difference value based on the first and second sets of pixels in the first frame and corresponding first and second sets of pixels in a reference frame corresponding to the first frame before application of the first watermark function and its complement.

34. Apparatus for adding a watermark to a video signal representing an image, the apparatus comprising:
  a watermark inserter generating a watermark and identifying first and second sets of pixels in a first frame for the watermark;
  a video processor, based on the watermark and the identified first and second sets of pixels, applying:
    (1) a first watermark function to a first set of pixels in a first frame;
    (2) a complement of the first watermark function to a second set of pixels in the first frame,
    (3) the complement of the first watermark function to a first set of pixels in a second frame corresponding to the first set of pixels of the first frame; and
    (4) the first watermark function to a second set of pixels in the second frame corresponding to the second set of pixels of the first frame,
      wherein the application of the first watermark function and the complement of the first watermark function in steps (a) through (d) tends to mask visibility of the watermark between the first and second frames.

35. The invention of claim 34, wherein relative positioning of the first and second sets of pixels tends to mask visibility of the watermark in the first frame.

36. Apparatus for detecting a watermark in a video signal representing an image, the apparatus comprising:
  a video processor identifying first and second sets of pixels in a first frame;
  a watermark detector:
    (1) calculating a first difference value for the first and second sets of pixels; and
    (2) determining whether the watermark is present based on the first difference value, wherein, when the watermark is present, the first difference value is related to prior application of a first watermark function to the first set of pixels and prior application of a complement of the first watermark function to the second set of pixels, and wherein:
      step (a) further comprises the step of identifying corresponding first and second sets of pixels in a second frame;
      step (b) further comprises the step of calculating a second difference value for the corresponding first and second sets of pixels in the second frame; and
      step (c) further comprises the step of determining whether the watermark is present based on the second difference value, wherein, when the watermark is present, the second difference value is related to prior application of the complement of the first watermark function to the first set of pixels in the second frame and prior application of the first watermark function to the second set of pixels in the second frame,
      wherein the prior application of the first watermark function and the complement of the first watermark function to the first and second sets of pixels in the first and second frames tends to mask visibility of the watermark between the first and second frames.

37. The invention of claim 36, wherein relative positioning of the first and second sets of pixels tends to mask visibility of the watermark in the first frame.

38. A computer-readable medium having stored thereon a plurality of instructions, the plurality of instructions including instructions which, when executed by a processor, cause the processor to implement a method for watermarking video signal representing an image, the method comprising the steps of:
  (a) applying a watermark function to a corresponding component of a first set pixels in a first frame;
  (b) applying a complement of the watermark function to a corresponding component of a second set of pixels in the first frame to vary a display characteristic over a frame,
  (c) applying the complement of the first watermark function to a first set of pixels in a second frame corresponding to the first set of pixels of the first frame; and
  (d) applying the first watermark function to a second set of pixels in the second frame corresponding to the second set of pixels of the first frame,
    wherein the application of the first watermark function and the complement of the first watermark function in steps (a) through (d) tends to mask visibility of the watermark between the first and second frames.

39. The invention of claim 38, wherein relative positioning of the first and second sets of pixels tends to mask visibility of the watermark in the first frame.

40. A computer-readable medium having stored thereon a plurality of instructions, the plurality of instructions including instructions which, when executed by a processor, cause the processor to implement a method for detecting a watermark in a video signal representing an image, the method comprising the steps of:

(a) determining whether one or more regions of the image are still;
(b) calculating, when one or more regions of the image are still, a difference value for corresponding components of a first set of pixels and a second set of pixels in a first frame; and
(c) determining whether the watermark is present based on the difference value, wherein the difference value is related to a watermark function applied to the first set of pixels and a complement of the watermark function applied to the second set of pixels, and wherein:
   step (a) further comprises the step of identifying corresponding first and second sets of pixels in a second frame;
   step (b) further comprises the step of calculating a second difference value for the corresponding first and second sets of pixels in the second frame; and
   step (c) further comprises the step of determining whether the watermark is present based on the second difference value, wherein, when the watermark is present, the second difference value is related to prior application of the complement of the first watermark function to the first set of pixels in the second frame and prior application of the first watermark function to the second set of pixels in the second frame,
   wherein the prior application of the first watermark function and the complement of the first watermark function to the first and second sets of pixels in the first and second frames tends to mask visibility of the watermark between the first and second frames.

\* \* \* \* \*